(12) United States Patent
Khoury

(10) Patent No.: US 7,979,388 B2
(45) Date of Patent: Jul. 12, 2011

(54) DERIVING HIERARCHICAL ORGANIZATION FROM A SET OF TAGGED DIGITAL OBJECTS

(75) Inventor: Sami Khoury, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 11/601,178

(22) Filed: Nov. 17, 2006

(65) Prior Publication Data

US 2008/0120310 A1    May 22, 2008

(51) Int. Cl.
*G06F 7/00* (2006.01)
(52) U.S. Cl. ......... 707/609; 707/705; 707/790; 707/821
(58) Field of Classification Search .................. None
See application file for complete search history.

(56) References Cited

U.S. PATENT DOCUMENTS

| | | | | |
|---|---|---|---|---|
| 6,070,167 | A | 5/2000 | Qian et al. ................. 707/102 |
| 6,094,657 | A | 7/2000 | Hailpern et al. ............. 707/103 |
| 6,199,059 | B1 * | 3/2001 | Dahan et al. ............... 1/1 |
| 6,240,407 | B1 * | 5/2001 | Chang et al. ............... 1/1 |
| 6,256,031 | B1 * | 7/2001 | Meijer et al. ............. 715/854 |
| 6,396,963 | B2 | 5/2002 | Shaffer et al. ............. 382/305 |
| 6,415,282 | B1 | 7/2002 | Mukherjea et al. ............ 707/3 |
| 6,484,156 | B1 * | 11/2002 | Gupta et al. ............... 1/1 |
| 6,484,166 | B1 | 11/2002 | Maynard ................... 707/5 |
| 6,502,101 | B1 * | 12/2002 | Verprauskus et al. .......... 1/1 |
| 6,510,424 | B1 * | 1/2003 | Anderson et al. ............ 707/100 |
| 6,760,065 | B1 * | 7/2004 | Whitcher ................. 348/231.2 |
| 6,977,679 | B2 | 12/2005 | Tretter et al. ............. 348/231.2 |
| 6,985,905 | B2 * | 1/2006 | Prompt et al. ............... 1/1 |
| 7,296,032 | B1 * | 11/2007 | Beddow .................. 707/103 R |
| 2002/0061506 | A1 * | 5/2002 | Catten et al. ............... 434/369 |

(Continued)

FOREIGN PATENT DOCUMENTS

JP    10251325    *   9/1998

OTHER PUBLICATIONS

Harada, S. et al., "Lost in Memories: Interacting with Photo Collections on PDAs", *Proceedings of the 2004 Joint ACM/IEEE Conference on Digital Libraries*, 2004, 325-333, http://www2sims.berkeley.edu.

(Continued)

*Primary Examiner* — Srirama Channavajjala
*Assistant Examiner* — Jessica N Le
(74) *Attorney, Agent, or Firm* — Woodcock Washburn LLP

(57) ABSTRACT

A method of and system for deriving hierarchical structure from a set of digital objects is presented. The set of digital objects, such as digital images for example, may include a plurality of digital objects each associated with a data tag (such as a date, location, and/or text description, for example) that is part of a flat property set that does not encode the hierarchical relationships of the data objects. The set of digital objects may be filtered by a query and a query engine. Each data tag of each digital object may be compared on the basis of a relationship, such as mathematical equality, proximity in value, and/or similarity of text strings, for example. A hierarchical data structure may be established that includes a parent data segment and a child data segment, each labeled with a related data tag and populated with one or more related digital objects. The hierarchical data structure may be represented by a tree or by nested folders.

12 Claims, 6 Drawing Sheets

U.S. PATENT DOCUMENTS

| | | | |
|---|---|---|---|
| 2002/0080170 A1* | 6/2002 | Goldberg et al. | 345/748 |
| 2002/0122596 A1 | 9/2002 | Bradshaw | 382/226 |
| 2002/0167538 A1 | 11/2002 | Bhetanbhotla | 345/700 |
| 2004/0059783 A1* | 3/2004 | Kazui et al. | 709/205 |
| 2004/0143649 A1* | 7/2004 | Feng et al. | 709/219 |
| 2004/0177319 A1* | 9/2004 | Horn | 715/501.1 |
| 2004/0199494 A1* | 10/2004 | Bhatt | 707/3 |
| 2004/0201702 A1 | 10/2004 | White | 348/207.99 |
| 2005/0036692 A1* | 2/2005 | Iida et al. | 382/217 |
| 2005/0050181 A1* | 3/2005 | Morioka | 709/221 |
| 2005/0160079 A1* | 7/2005 | Turski et al. | 707/3 |
| 2005/0166149 A1* | 7/2005 | Frigon et al. | 715/712 |
| 2005/0177560 A1* | 8/2005 | Morioka | 707/3 |
| 2005/0213147 A1* | 9/2005 | Minatogawa | 358/1.15 |
| 2005/0271352 A1* | 12/2005 | Yokouchi | 386/4 |
| 2006/0139461 A1 | 6/2006 | Matsui et al. | 348/231.2 |
| 2006/0218180 A1* | 9/2006 | Bodlaender et al. | 707/103 R |
| 2006/0236222 A1* | 10/2006 | Marmigere et al. | 715/513 |
| 2007/0055928 A1* | 3/2007 | Pery et al. | 715/514 |
| 2007/0078832 A1* | 4/2007 | Ott et al. | 707/3 |
| 2007/0078883 A1* | 4/2007 | Hayashi et al. | 707/102 |
| 2007/0118802 A1* | 5/2007 | Gerace et al. | 715/738 |
| 2008/0059512 A1* | 3/2008 | Roitblat et al. | 707/102 |
| 2008/0183674 A1* | 7/2008 | Bush et al. | 707/3 |
| 2008/0319953 A1* | 12/2008 | DeShan et al. | 707/3 |

OTHER PUBLICATIONS

Mine, T. et al., "Categorizing Questions According to a Navigation List for a Web-Based Self-Teaching System: AEGIS", *Proceedings of the International Conference on Computers in Education*, 2002, 5 pages, http://ieeexplore.ieee.org.

Naaman, M. et al., "Automatic Organization for Digital Photographs with Geographic Coordinates", *Proceedings of the 2004 Joint ACM/IEEE Conference on Digital Libraries*, 2004, http://ieeexplore.ieee.org, 53-62.

Yagawa, Y. et al., "The Digital Album: A Personal File-tainment System", *Proceedings of Multimedia*, 1996, 433-439, http://ieeexplore.ieee.org.

* cited by examiner

DERIVING HIERARCHICAL ORGANIZATION FROM A SET OF TAGGED DIGITAL OBJECTS

BACKGROUND

A collection of objects, and particularly a collection of digital objects, may be hierarchically organized for convenience in searching for and locating a particular object. For example, a file stored on a computer may be represented by the computer's file system as being located within a folder. The computer may have a storage medium such as a disk drive with a base folder at a first-level, a number of folders at a second-level where each second-level folder may be a child of the first-level folder, a number of folders at a third-level down where each third-level folder may be a child of a particular second-level folder, etc., and where each file of the collection of files may reside within a particular folder. Each folder may be given a title that relates to the files and other folders it stores. The first-level folder may have the broadest scope, and each sub-folder may have a subordinate significance. As a result, when objects are organized hierarchically, a user may find a particular object quickly by sequentially opening folders from the first-level down matching the descriptive folder titles with the character of the intended object.

However, there are problems associated with using hierarchical structure to organize digital objects. In order for the hierarchical structure to be an effective organizational tool, the character of the individual objects must conform to the folder titles in which they are held. Often this requires a user to pre-establish some organizational scheme of folder titles before populating the folders. Furthermore, if a hierarchical organization is not imposed as the objects are incorporated within the collection, it may be difficult to re-organize the objects later. For example, even though a organization of folders exists, there may be nothing to prevent a user from storing every object of the collection in one folder, such as the base folder.

One particular collection of objects that is illustrative may be a collection of digital photographs on a computer. The user may intend to hierarchically organizing the digital photographs into relevant folders. For example, the user may wish to hierarchically organize the photographs by date taken, by location taken, by subject matter, by individuals pictured, and the like. If the organizational scheme is not maintained over time, the digital photographs may nevertheless end up unorganized, in a single folder. As the collection grows relatively large, the collection as dumped may be difficult to navigate except by a manual review of each photograph in the collection.

On the other hand, the user may not establish a pre-determined organizational scheme for storing photos, but the individual may "tag" individual photographs with a text annotation associated with the digital file. The tags need not conform with any pre-determined organizational scheme. The individual may tag each individual photograph based solely on the subject matter of the photograph itself, rather than how that photograph might fit within an overall organizational scheme.

Each tag may relate to any aspect of the photograph such as date taken, location taken, subject matter, individuals pictured, and the like. In addition, digital photographs may be available to a broad number of people through the internet and online picture galleries. The picture gallery may allow viewers to "tag" individual photographs with a text annotation. The collection of text annotations may grow quite large in number and diverse in description. The tags alone may facilitate searching by providing searchable descriptions, but the tags alone do not provide a hierarchical organization system because the tags may not be created according to any pre-determined organizational scheme and because the tags may not include syntax related to a hierarchical organization system.

Previous systems have employed tags to aid in the creation of hierarchical data structures, but they have been limited to establishing a pre-determined organizational scheme and including hierarchical syntax within the tags. See U.S. Pat. No. 6,484,166. When tags are created without regard to any pre-determined organizational scheme and do not include syntax related to a hierarchical organization system, the content of the tags themselves may imply relationships among the individual digital objects. Thus, there is a need for a method and a system to derive hierarchical organization from flat sets of tagged digital objects, leveraging the inherent collective information of the descriptive attributes to organize files and other digital objects into hierarchical structures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for deriving hierarchical structure from a set of digital objects where the properties of the set of digital objects do not directly encode the hierarchical structure is presented. The set of digital objects, such as digital images and audio files for example, may include a number of individual digital objects each associated with a data tag. The data tag may represent some information related to the respective digital object, such as date, location, and/or text description, for example. The set of digital objects may be identified and each digital object compared with each other. A subset/superset relationship may be computed among the data tags to determine a parent data segment and a child data segment of a hierarchical data structure. Each parent data segment and child data segment may each be labeled with a related data tag and each may be populated with one or more related digital objects. The hierarchical data structure may be displayed.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments that are presently preferred. As should be understood, the invention is not limited to the precise arrangements and instrumentalities shown. In the drawings.

DETAILED DESCRIPTION OF ILLUSTRATIVE EMBODIMENTS

Figure 1:
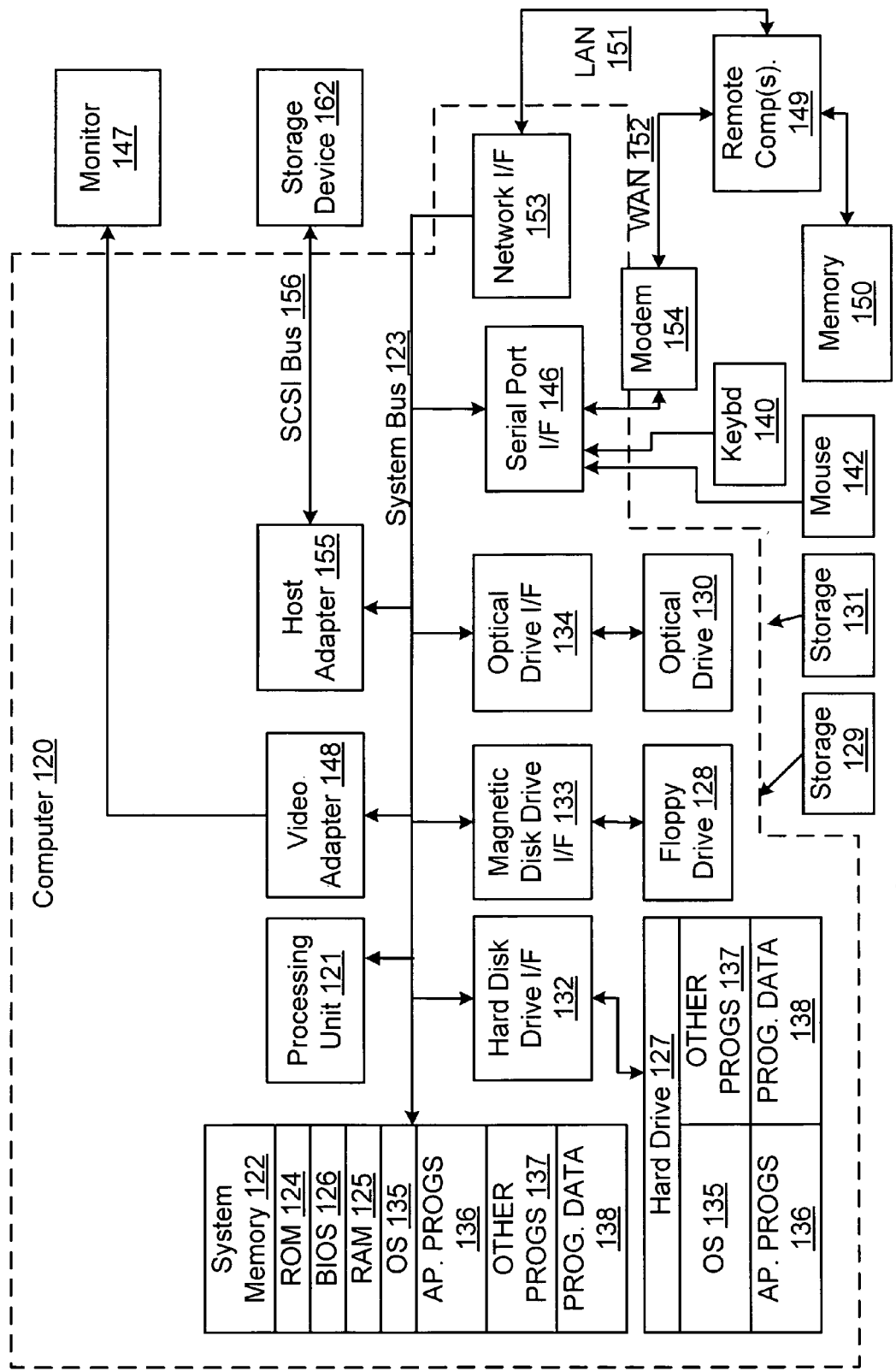
FIG. 1 depicts a block diagram of a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Set of Digital Objects

Figure 2:
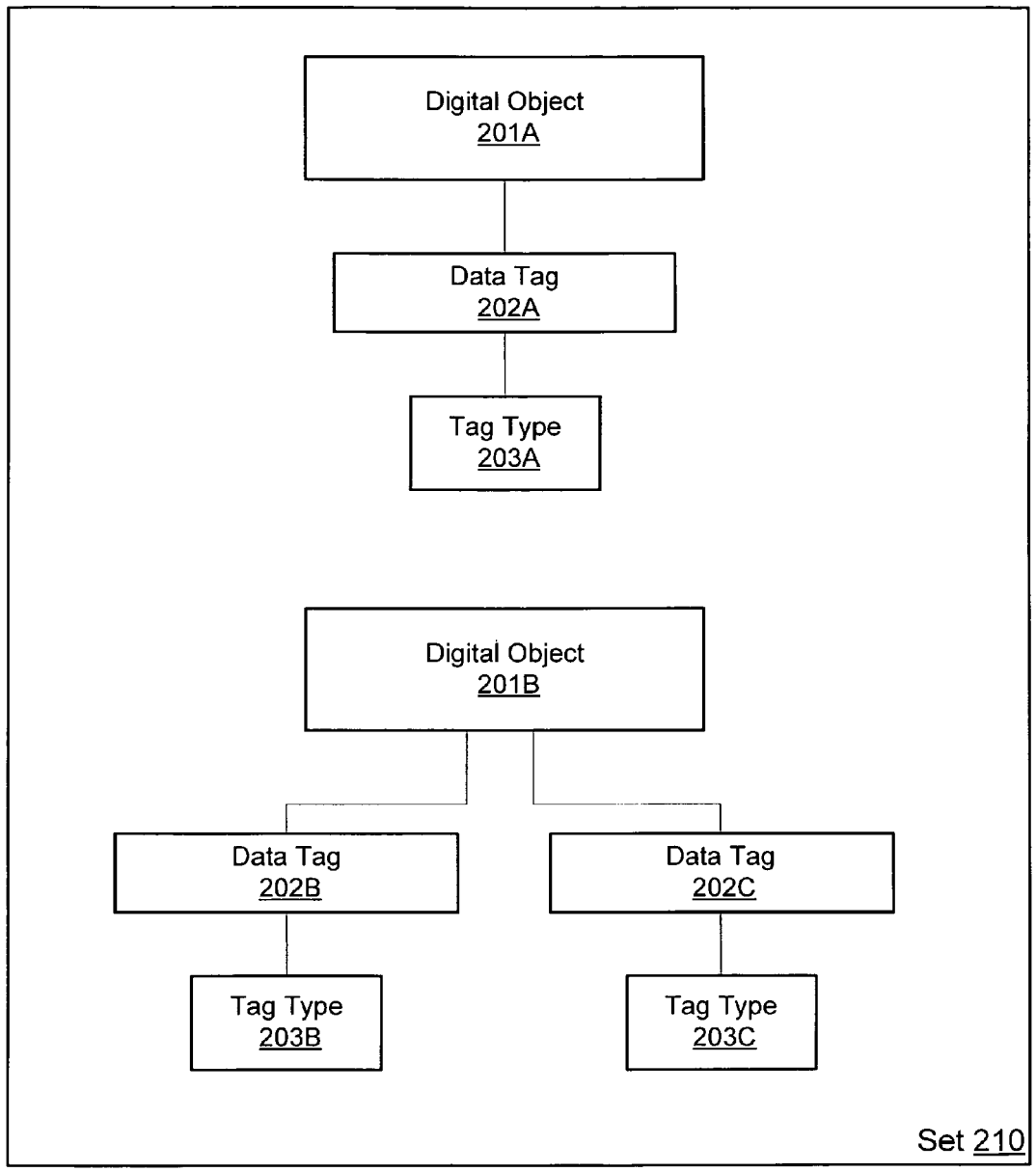
FIG. 2 illustrates a set of tagged digital objects.

In FIG. 2, a set 210 of digital objects 201A-B may be accessible by a computer 120. The digital objects 201A-B may be stored as files on a hard drive 127, floppy drive 128, optical 130, or system memory 112, for example. Each digital object 201A-B may be any countable object such as a digital photograph, word-processing document, audio/video file, or other digital files, for example. A computer may be used to operate on each digital object 201A-B, including listing the objects, sorting the objects, and editing the objects, for example.

Each digital object 201A-B may have an associated data tag 202A-C. A digital object 201A-B may have more than one data tag 202A-C associated with it. For illustration, in FIG. 2, digital object 201A is associated with one data tag 202A, and digital object 201B is associated with two data tags 202B-C. The data tag 202A-C may be an annotation of the digital object 201A-B. The data tag 202A-C may be of any data type such as a text string, a floating point number, a binary number, or an integer, for example. The data tag 202A-C may represent a date, a description, a place or location, geographical coordinates, author, title, subject matter, category, or any other information that would relate to the associated digital object 201A-B. The data tag 202A-C may be embodied in any manner accessible to the computer 120. For example, if the digital object 201A-B were stored as a file on a hard disk, the data tag may be appended to the file or in a separate file with a reference or pointer to the file of the digital object 201A-B. The data tag 202A-C may be a construct and this description is not meant to be limiting to any one embodiment of how the annotation may be encoded or made accessible to the computer 120.

Each data tag 202A-C may include a tag type 203A-C. Like the data tag 202A-C, the tag type 203A-C may be any data type such as a text string, a floating point number, a binary number, or an integer, for example. The tag type 203A-C may be populated with data representative of category or type of information represented by the data tag 202A-C. For example, a tag type 203A-C may be populated with a string representing "LOCATION" and the respective data tag may be populated with a string representing "Seattle." As another example, where the digital object 201B may be associated with two or more data tags 202B-C and respective tag types 203B-C, a tag type 203B may be populated with a string representing "LOCATION," and the respective data tag 202B may be populated with a string representing "Philadelphia." Continuing the example, the tag type 203C may be populated with a string representing "LOCATION," and the respective data tag 202B may be populated with a string representing "Pennsylvania." While a tag type 203A-C may be helpful to categorize the type of information encoded by the data tag 202A-C, a tag type 203A-C need not be required to practice a data tag 202A-C. The tag type 203A-C may be an optional aspect to improve the descriptiveness of the data tag 202A-C. Like the data tag 202A-C, the tag type 203A-C may be embodied in any manner accessible to the computer 120. For example, each tag type 203A-C may be appended to the respective data tag 202A-C.

In practice, it is desirable that the content of the data tag 202A-C be any descriptive data. For example, such descriptive information may include date and time information relating to when the digital object 201A-B was produced, reviewed, edited, or the like. The descriptive information may also relate to the content of the digital object 201A-B. Assuming for illustration each digital object 201A-B as a digital photograph, the descriptive information may include date and time the photograph was taken, location information relating to where the photograph was taken, author information relating to who took the photograph, and content information relating to the subject matter of the photograph, for example. The descriptive information is thus part of a flat property set and is generally not representative of hierarchical information.

The information stored by a data tag 202A-C and tag type 203A-C may be automatically provided as each tag is created. Assuming again for illustration each digital object 201A-B as a digital photograph embodied as a file, upon taking the photograph a number of data tags and tag types may be automatically populated with date and time information relating to when the photograph was taken or when the digital photograph file is first created.

The data tag 202A-C and tag type 203A-C may be edited, altered, deleted, moved, and/or added. The data tag 202A-C and tag type 203A-C may be manually or automatically populated with descriptive information by any suitable application. Assuming for illustration each digital object 201A-B as a digital photograph, each digital photograph may be displayed in a personal or online photo gallery. Each viewer or user of the photo gallery application may add annotations to each digital photo as a data tag 202A-C and tag type 203A-C. The application may present pre-established prompts for information and present them to the user for input, where the user's input may be populated as a data tag 202A-C and the pre-established category as a tag type 203A-C. Such a scheme may increase consistency among data tag 202A-C and tag type 203A-C.

Figure 3A:
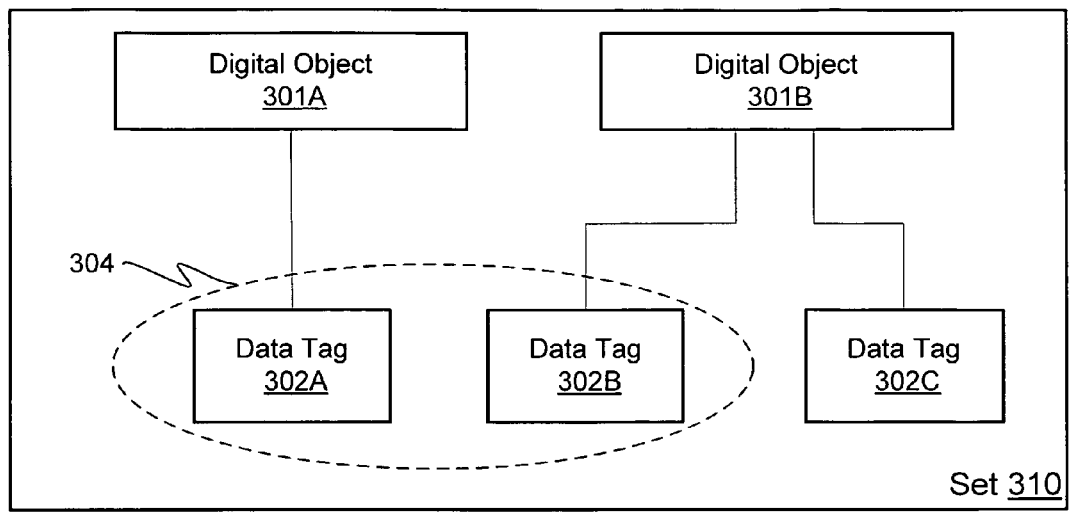
FIGS. 3A-B depict exemplary tagged digital objects as a set and as a hierarchical data structure, respectively.

FIG. 3A, for illustration, depicts an exemplary set 310 of digital objects 301A-B where digital object 301A is associated with data tag 302A and digital object 301B is associated with data tag 302B and data tag 302C. The set 310 may be organized as a flat collection of digital objects 301A-B. The data tags 302A-C may provide descriptive data relating to each respective digital object 301A-B. The set 310 may be stored in a system memory 112 of a computer 120, for example.

Data tag 302A and data tag 302B may be related in value. This relationship 304 may be mathematical equality, proximity in value, similarity in text, or any other deniable relationship between data. For example, the relationship 304 may be mathematical equality, where a data tag 302A may represent the year "2006," and another data tag 302B may also represent the year "2006." Also for example, relationship 304 may be similarity in text, where a data tag 302A may represent the text string "USA" and a data tag 302B may represent the string "usa." Here the strings may be similar except that the first may be represented in all capital characters and the second in lower case characters. Also for example, the relationship 304 may be proximity in value, a data tag 302A may represent the date "Jan. 1, 2006" and data tag 302B may represent the date "Jan. 31, 2006" Here both may be related as being within the month of January.

The relationship 304 between the data tags may be any known operation useful to compare two data tags. In one embodiment, the relationship 304 may be a table with pairs of entries used to compare respective data tags 302A-B. This flexible relationship 304 may be desirable when users manually enter data tags 302A-C because, users may not always use the same syntax when entering similar information. For example, a user may enter "New Jersey" for data tag 302A and subsequently enter "NJ" for data tag 302B. A table with entries representative of relationship 304 may equate "New Jersey" with "NJ," and as a result establish a relationship 304 between data tag 302A and data tag 302B.

Figure 3B:
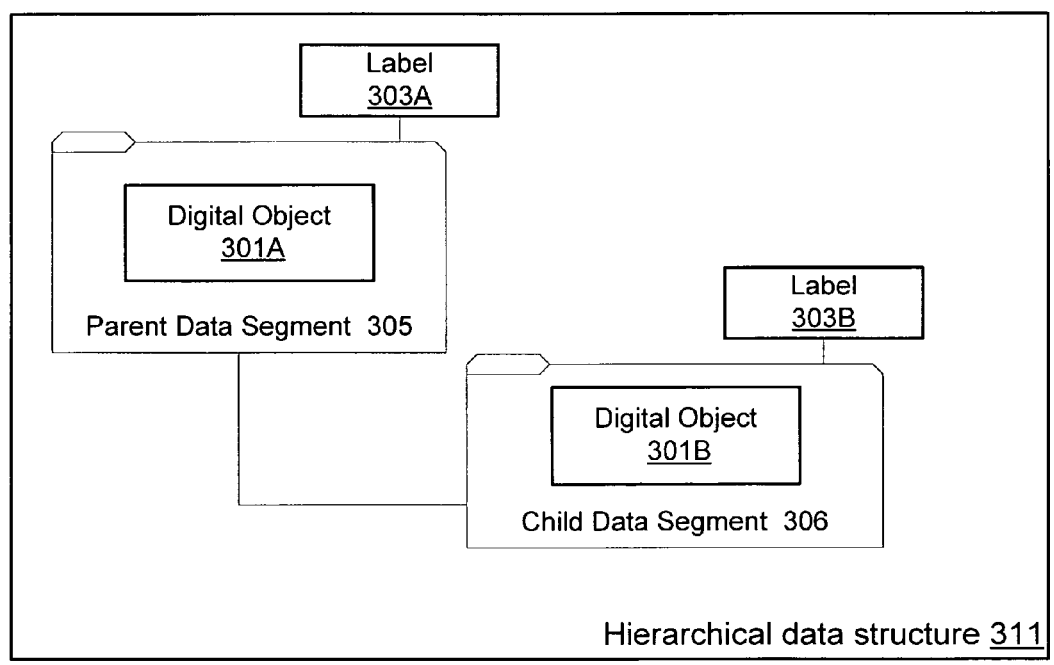

FIG. 3B for illustration depicts an exemplary hierarchical data structure 311 organizing set 310. The hierarchical data structure 311 may include a parent data segment 305 and subordinate child data segment 306. The parent data segment 305 and the child data segment 306 may be represented by a tree or nested folders, for example. The parent data segment 305 may be labeled with the label 303A, and the child data segment 306 may be labeled with label 303B. The parent data segment 305 may be populated with the digital object 301A, and the child data segment 306 may be populated with the digital object 301B.

Furthermore, the hierarchical data structure 311 may not be limited to a parent data segment 305 and a child data segment 306; within the hierarchical data structure 311, a first child data segment 306 may also be a parent data segment 305 in relation to a second child data segment 306. In this arrangement, the hierarchical data structure 311 may constitute three levels, for example. In addition, the parent data segment 305 and the child data segment 306 may relate as one-to-many, where a parent data segment 305 may relate to more than one subordinate child data segments 306. Any number of parent data segments 305 and child data segments 306 within the resources of the medium on which they are stored may constitute a hierarchical data structure 311.

For illustration purposes, since data tag 302A and data tag 302B may be related by relationship 304, set 310 may be represented as a hierarchical data structure 311. Data tag 302C may be considered subsumed by relationship between data tag 302A and 302B, since digital object 301B is associated with both data tag 302B and data tag 302C. For example, allow for illustration purposes, data tag 302A and data tag 302B each as representing the text string "Pennsylvania" and allow data tag 302C to represent the text string "Philadelphia." The equality relationship may exist between data tag 302A and data tag 302B, both representing a text string "Pennsylvania." Digital object 301B may be subordinate as being tagged with both "Philadelphia" and "Pennsylvania."

As a result, continuing with the illustration, the parent data segment may be labeled with a label 303A. The label 303A may be consistent with data tag 302A, 302B or both. According to this illustration, it may be labeled as "Pennsylvania." The child data segment may be labeled with a label 303B. The label 303B may be consistent with data tag 302C. According to this illustration, it may be labeled as "Philadelphia."

When the hierarchical data structure 311 may be displayed, the subordinate relationship may be apparent and the redundant information may be pruned. A listing of the relevant information in set 310 may merely be a listing of data tags 302A-C. Consistent with the illustration, such as listing may be: "Pennsylvania," "Pennsylvania," and "Philadelphia." Contrast this with a hierarchical data structure 311 generated from the set 310, where duplicate data tags 302A-C representing "Pennsylvania" may be pruned and reduced to a single label 303A. Within the parent folder may be digital object 301A and within the subfolder may be digital object 301B.

Figure 4A:
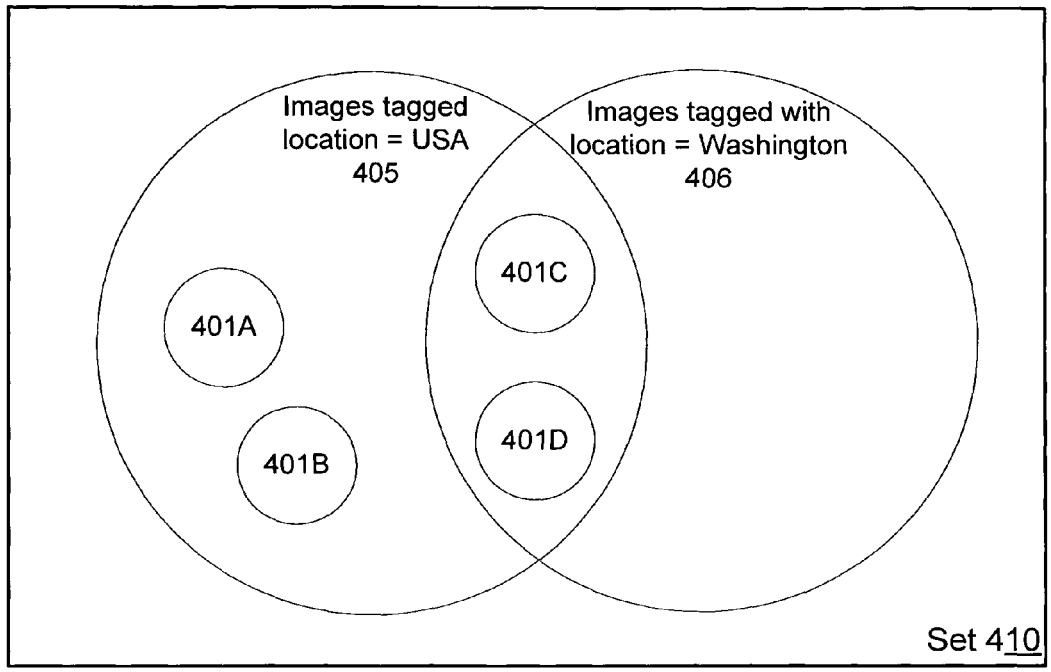
FIGS. 4 A-B depict exemplary tagged digital images as a set and as a hierarchical data structure, respectively.
Figure 4B:
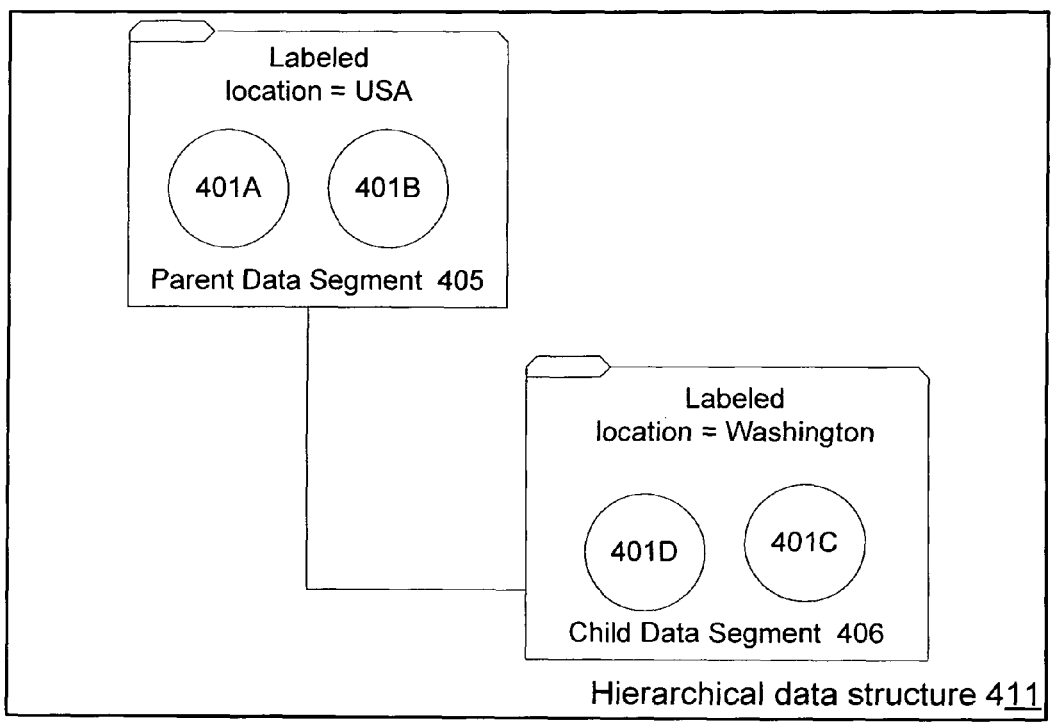

To further illustrate, FIG. 4A depicts a Venn diagram describing deriving hierarchical information from the set 410. FIG. 4A may represent four digital objects 401A-D. Each digital object 401A-D is tagged. Four digital objects 401A-D may be tagged representative of "location=USA" and grouped together as such. Two digital objects 401C-D may be tagged representative of both "location=USA" and "location=Washington." Here, the group of digital objects 401C-D is a strict subset of group of digital objects 401A-D, those tagged representative of "location=USA." Similarly, group of digital objects 401A-D is a superset of the group of digital objects 401C-D. Since digital objects 401C-D also are tagged representative of "location=Washington," it may be proper to organize Washington subordinate to USA. As a result, from this flat set 410 of tagged digital objects 401A-E, a hierarchical data structure 411 as shown in FIG. 4B may be derived with a parent data segment 405 and a child data segment 406, each represented by a folder in a tree structure. The parent data segment 405 may be labeled "USA" and may contain digital objects 401A-B. The child data segment 406 may be labeled "Washington" and may contain digital objects 401C-E. The child data segment 406 may be subordinate to the parent data segment 405.

Query and Query Engine

Figure 5:
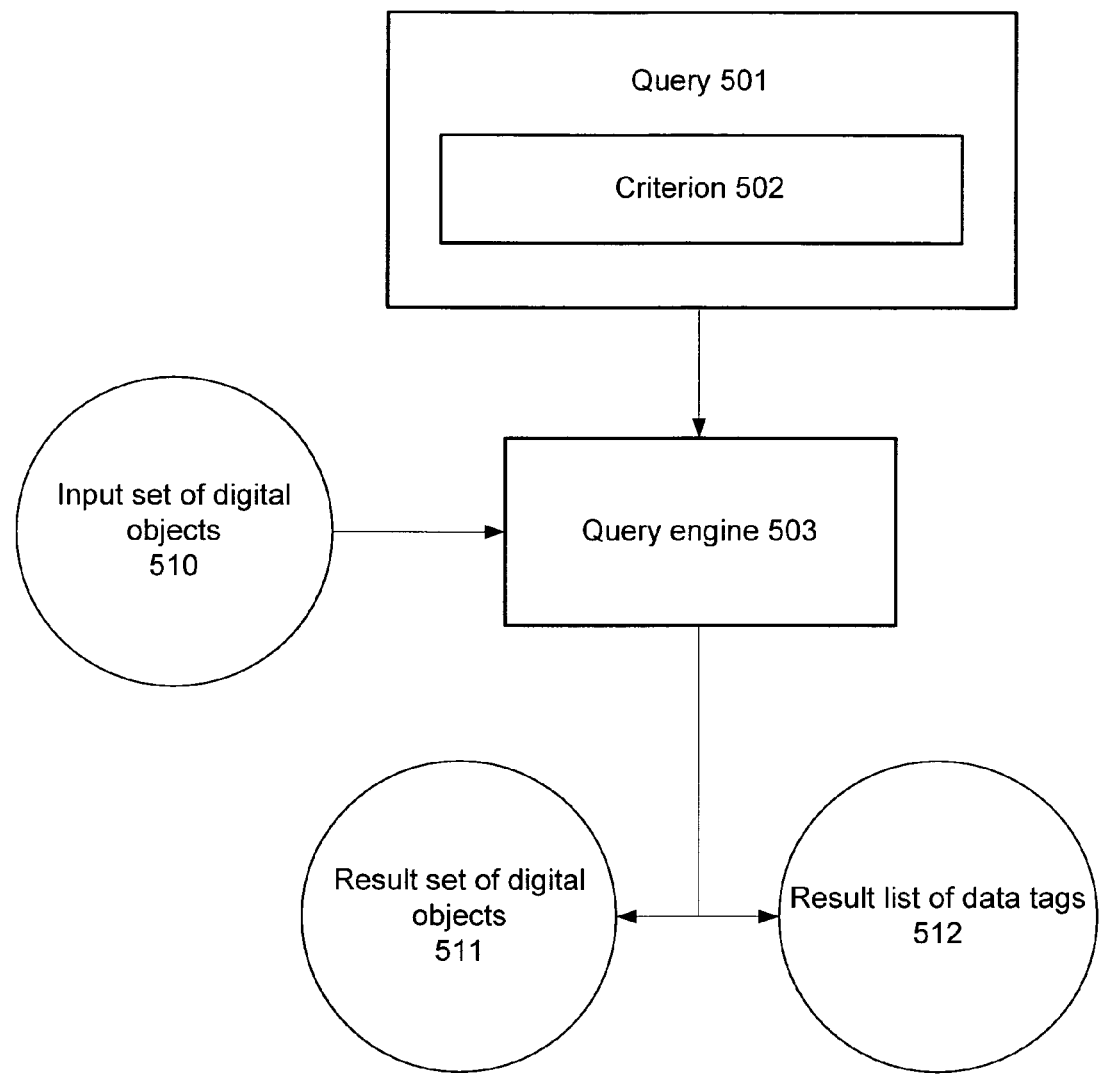
FIG. 5 depicts a query engine and its respective inputs and outputs.

Before organizing a set of digital objects 310 into a hierarchical data structure 311, it may be desirable to limit or establish a boundary for which digital objects 301A-B may be included. This may be especially helpful when the set of digital objects 310 is very large. As shown in FIG. 5, a query 501 may include a criterion 502. The query 501 may be a logical filter which, when processed by a query engine 503 in connection with an input set digital objects 510, filters the input set digital objects 510 into a result set of digital objects 511 and a related result list of data tags 512. The query engine 503 may consider the criterion 502 to determine which individual digital objects 201A-B within the input set of digital objects 510 will ultimately constitute the result set of digital objects 511 and result list of data tags 512. The query engine may be a set of instructions operable by a processing unit 121 in a computer 120, for example. The query 501 may not limit the result set of digital objects 510, such that the result set of digital objects 511 is identical to the input set of digital objects 510. A query 501 that may not limit the result set of digital objects may be considered a null query.

The query 501 may be any precise way to derive a second set from a first set. Generally the query 501 may have a syntax and represent information and operators. The query 501 may instruct the query engine 503 to consider and compare the criterion 502 and aspects of the input set digital objects 510. The criterion may be any rule or operation consistent with the query 501. For example, a query may take a uniform resource identifier (URI) syntax of a "/" character followed by the criterion 502. For example the query "/<<type>>" may relate to a result set of digital objects 511 and their respective data tags 202A-C with a tag type 203A-C equal to the "<<type>>" listed in the query. The criterion 502 may include one or more fields separated by a "/" character. For example, the query "/<<type>>/<<tag>>" may return a result set of digital objects 511 and result list of data tags 512 where each digital object 201A-B may be associated with a data tag equal to "<<tag>>" and of a tag type 203A-C equal to "<<type>>."

For purposes of illustration, allow each digital object 201A-B within the input set of digital objects 510 to be a digital photograph, each appropriately tagged with data tags 202A-C representing locale, state, and country where each respective tag type 203A-C may be set as "location." The query 501 "/location" may return a result set of digital objects 511 and the respective result list of data tags 512, like the following: "Canada," "Japan," "Kamakura," "Oregon," "Portland," "Seattle," "Tokyo," "USA," "Vancouver," and "Washington," for example. This result set of digital objects 511 and result list of data tags 512 organized hierarchically may contain hierarchical data structures 311 where the parent data segments 305 are labeled, "Canada," "USA," and "Japan" respectively, for example. Each parent data segment 305 with one or more child data segments 306. For example, "Washington" may be subordinate to "USA." In addition, a child data segment 306 of a first hierarchical data structure 311 may also represent a parent data segment 305 of a second hierarchical data structure 311. For example, while "Washington" may be subordinate to "USA," "Seattle" may be subordinate to "Washington."

Continuing the illustration, where the query 501 may be "/location/USA/location" the result list of data tags being returned from the query engine 503 may be: "Oregon," "Portland," "Seattle," "USA," and "Washington." This result set of digital objects 511 and result list of data tags 512 organized hierarchically may contain hierarchical data structures 311 where both "Oregon" and "Washington" may subordinate to "USA," and "Portland" and "Seattle" may be subordinate to "Oregon" and "Washington" respectively.

Continuing the illustration, additionally allow each digital object 201A-B within the input set of digital objects 510 to be also tagged by date, where the tag type 203A-B may be set as "date" and each data tag may include a text string representative of the date, <<month/year>> for example. As a result, a query 501 "/location/USA/date/" may return a result set of digital objects 511 and result list of data tags 512 where each digital photograph was taken in the USA and each is tagged with a date. The hierarchical data structure may include "USA" as a parent data segment 305 and a number of month-year combination as child data segments 306.

Process for Deriving Hierarchical Structure

Figure 6:
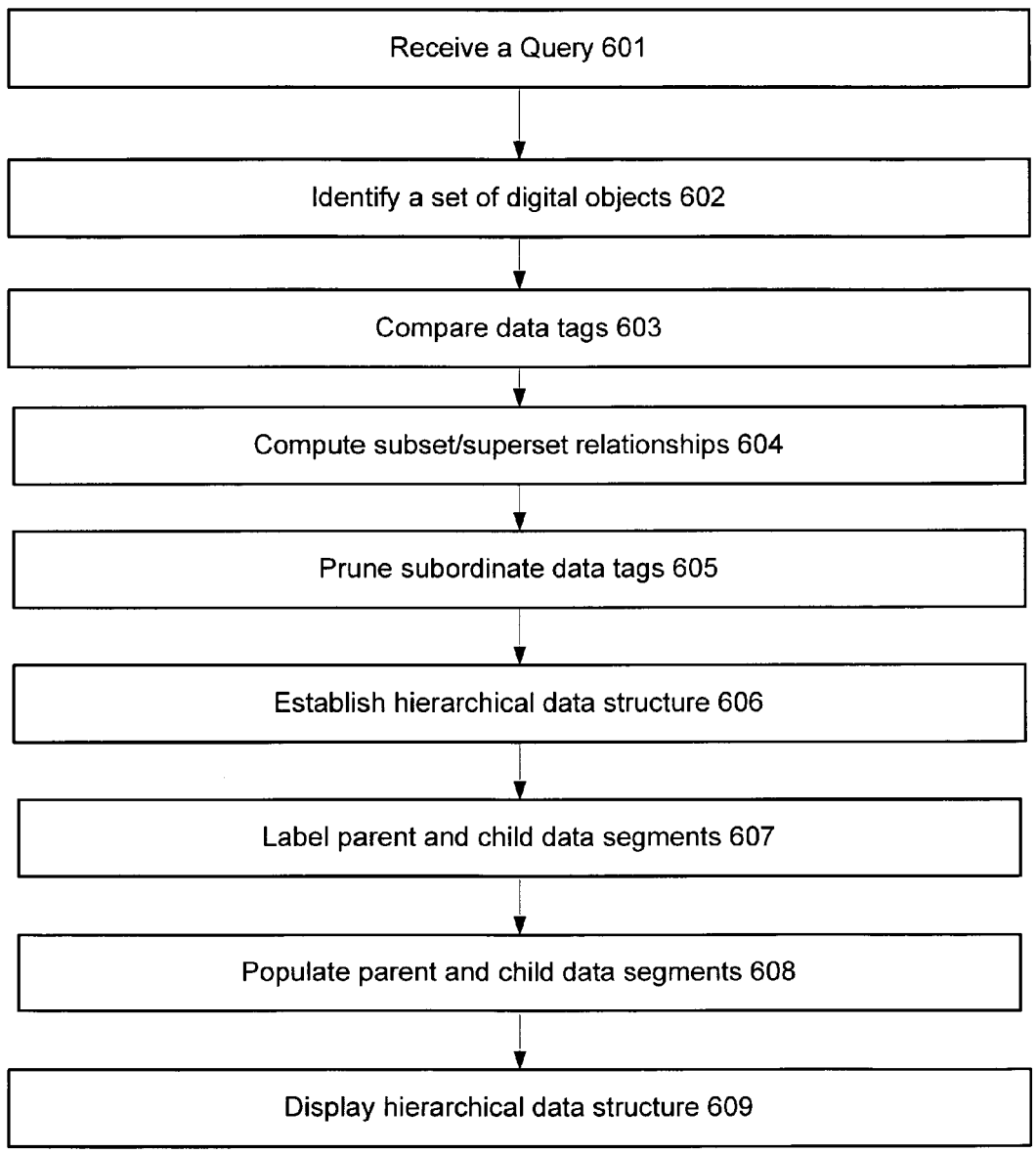
FIG. 6 depicts a process flow for deriving hierarchical structure from a flat set of tagged digital objects.

FIG. 6 depicts a process flow for deriving hierarchical structure from a flat set of tagged digital objects 201A-B. The process depicted in the FIG. 6 may be implemented in software loaded on a computer 120 or other computing system, such as a distributed or client/server architecture for example. Operations relating to digital objects 201A-B and data tags 202A-C may be performed directly or by index. For example, each digital object 201A-B and each data tag 202A-C within the set of digital objects 210 may be indexed, and operations that relate to the digital objects 201A-B and data tags 202A-C, such as querying and comparing for example, may be performed at the index of digital objects 201A-B and data tags 202A-C.

Receiving a query 601 at a query engine 503 may be a user entered query or a computer-generated query. Receiving a query 601 may occur responsive to a function call in software, a macro, or other automated process. Receiving a query 601 may entail a local source of the query information such as a local user at a computer 120 or may entail a remote source of the query information such as a remote user at a remote computer 120 connected via a network, such as the internet for example. Receiving a query 601 may occur via a web page form, e-mail, chat session, or other communication medium suitable for transporting the query 501. Receiving a query 601 may be receiving a null query, where the result set of digital objects 511 is identical to the input set of digital objects 510.

Identifying a set of digital objects 602 may be responsive to the query or it may be directly initiated where no query or a null query is present. Identifying a set of digital objects 602 may entail identifying the output folder, directory, location, listing, file, or the like of a result set of digital objects 511 or result list of data tags 512. Identifying a set of digital objects 602 may occur directly when a user specifies a folder, directory, location, listing, set of files, URL, or the like as a set of digital objects. Where embodied in an application, identifying a set of digital objects 602 may relate to identifying pointers, data structures, or locations in system memory 122 where digital objects 201A-B are stored. Also, where the digital objects 201A-B may be embodied as digital images, identifying a set of digital objects 602 may include identifying digital images, online galleries, digital albums, digital photo databases, and the like within an application.

Comparing data tags 603 and determining subset relationships 604 may include indexing each data tag 202A-C and tag type 203A-C presently associated with digital objects 201A-C within the identified set 210 and categorizing each data tag 202A-C according to a specified relationship 304 with each other. The relationship may include mathematical equality, similarity, within a given range, and the like, for example. As each data tag 202A-C and tag type 203A-C are categorized, by considering respective digital objects 201A-B, subset relationships may be established. Where strict subsets may exist, the subset relationship may be apparent. Where a strict subset does not exists, but a sufficient volume of data tags 202A-C are within a subset, it may be allowable to establish the subset relationship and include the outlying data tags 202A-C. For example, if a sufficient number of digital objects 201A-B are tagged with both "Philadelphia" and "Pennsylvania," then the subset relationship may be established including any outliers, such as digital objects that are tagged with "Philadelphia" without "Pennsylvania." If the set of digital objects 210 does not contain any subset relationships then the set 210 itself may be displayed 609. Displaying the set 609 may include propagating a representation of the set logically to another application or physically on an output device such as a monitor 147 for example. On the other hand, if a subset relationship exists, it may allow establishing a hierarchical data structure 605.

Moreover, computing subset/superset relationships 604 may include parsing each digital object 201A-B and each data tag 202A-C within the set of digital objects 210. Also, for example, computing subset/superset relationships 604 may include indexing each digital object 201A-B and each data tag 202A-C within the set of digital objects 210. The digital objects 201A-B may be grouped according to the value of the data tags 202A-C, forming a plurality of groups, each containing one or more digital object 201A-B with associated with data tags 202A-C related in value. For each group, it may be determined whether each group is related to another group by a subset or superset relationship. The digital objects in one group may be compared to the digital objects in another group to determine whether a subset or superset relationship. Where all the digital objects of a second group are also contained in first group, the second group may be considered a subset of the first group. Accordingly, the first group may be considered a superset of the second group. In addition, groups may be a subset and a superset to other groups. Data tags 202A-C which are within a subset group may be considered subordinate to at least one of those in a superset group.

Pruning data tags 605 considered subordinate may include categorizing the data tags 202A-C to remove or mark data tags 202A-C computed to be subsets. Pruning subordinate data tags 202A-C may improve the efficiency and speed of processing the hierarchical data structure 605 since redundant or subordinate data tags may be marked as such.

Establishing a hierarchical data structure 605 may include building an appropriate parent-child data structure in system memory 122. Establishing a hierarchical data structure 605 may entail allocating system memory 122 and other computing resources. Establishing a hierarchical data structure 605 may include creating a parent data segment 305, creating a child data segment 306, and relating the two where the child data segment 306 may be subordinate to the parent data segment 305. Establishing a hierarchical data structure 605 may include creating a logical folder within a file system or database and nesting within it a subfolder. Where a group may be both a superset and a subset of other groups, the parent data segment 305 of a first hierarchical data structure 605 may also be a child data segment 306 of a second hierarchical data structure 605, resulting in a three layered hierarchy.

Labeling 606 the parent data segment 305 and the child data segment 306 may include associating each with a descriptive text. The labeling 606 may prompt a user to provide each label 303A-B. The labeling 606 may select a label consistent with the related data tag. For example, if the related data tag may represent "location=USA," then the related label may be the text string "USA."

Populating 607 the parent data segment 305 and the child data segment 306 may include associating each with the related digital objects 201A-B. Populating 607 may entail creating logical pointers or links within the parent data segment 305 and the child data segment 306 indicating which digital objects 201A-B are associated with the respective data segment. Within the context of a file system, populating 607 may include moving a file within a folder or creating a link within a folder. Within the context of an application, populating 607 may include listing the digital objects 201A-B associated with each parent data segment 305 and child data segment 306. Within the context of a web application, populating 607 may include listing a hyperlink to or URL of each digital object 201A-B associated with each parent data segment 305 and child data segment 306.

Displaying 608 the hierarchical data structure 311 may include propagating a representation of the hierarchical data structure 311 logically to another application or process, or physically on an output device such as a monitor 147, web page, paper print-out, handheld device, and the like. The displaying 608 may take the visual form or a tree structure, nested folders, organizational chart, tabbed text lists or links, linked web pages, and the like, for example. The displaying 608 may include features that allow aspects of the hierarchical data structure 311 to be expanded or collapsed to simplify viewing. Within the context of displaying 608 the hierarchical data structure 311 to another application or process, displaying 608 may include passing or returning a pointer to the hierarchical data structure 311, displaying 608 may also include presenting a link, such as a hyperlink or URL, to the hierarchical data structure 311. In addition, parts of the hierarchical data structure 311 may be displayed without displaying the whole hierarchical data structure 311. For example, the parent data segment 305 may be displayed without displaying the child data segment 306. For example, the child data segment 306 may be displayed without displaying the parent data segment 305.

What is claimed:

1. A computer-implemented method of deriving a hierarchical structure of a set of digital objects, the method comprising:
   in response to receiving a query comprising a criterion, identifying, by the computer, the set of digital objects consistent with the criterion, each of the digital objects associated with a data tag comprising descriptive information including at least one flat property not representative of a predetermined hierarchical structure;
   for each of the digital objects in the set, comparing, by the computer, descriptive information with descriptive information associated with other digital objects in the set, and grouping digital objects having related descriptive information into at least a superset group and a subset group, wherein the superset group comprises each digital object in the subset group;
   creating first and second parent data segments and first and second child data segments, wherein the first child data segment is also the second parent data segment;
   labeling the first and second parent data segments consistent with descriptive information of data tags associated with the digital objects in the superset group;
   labeling the first and second child data segments consistent with descriptive information of data tags associated with the digital objects in the subset group; and
   determining, by the computer, the hierarchical structure by populating the first parent data segment with the digital objects having data tags with descriptive information related to those of the digital objects in the superset group and the first child data segment with the digital objects having data tags with descriptive information related to those of the digital objects in the subset group; and
   displaying a hierarchical data structure comprising the first and second parent data segments and the first and second child data segments.

2. The method of claim 1 wherein the criterion comprises a uniform resource identifier (URI) syntax.

3. The method of claim 1 wherein each data tag comprises a data tag label, and where identifying the set of digital objects further comprises identifying each data tag label consistent with the criterion.

4. The method of claim 1 wherein identifying the set of digital objects comprises identifying a set of digital images.

5. The method of claim 4 wherein each data tag comprises a text string annotation of the digital object.

6. A computer-readable storage medium containing instructions for a computing system directed to deriving a hierarchical structure of a set of digital objects, the instructions when executed by a computer processor causing the computer processor to perform a method comprising:
   in response to receiving a query comprising a criterion, identifying the set of digital objects consistent with the criterion, each of the digital objects associated with a data tag comprising descriptive information including non-hierarchical information;
   for each of the digital objects in the set, comparing descriptive information with descriptive information associated with other digital objects in the set, and grouping digital objects associated with data tags having related descriptive information into at least a superset group and a subset group, wherein the superset group comprises each digital object in the subset group;
   creating first and second parent data segments and first and second child data segments, where the first and second parent data segments are consistent with the data tags associated with the digital objects of the superset group and the first and second child data segments are consistent with the data tags associated with the other digital objects of the subset group, and the first child data segment is also the second parent data segment;
   pruning the data tags associated with the digital objects of the subset group;
   populating the first parent data segment with digital objects having data tags with descriptive information related to those of the digital objects in the superset group; and
   displaying a hierarchical data structure comprising the first and second parent data segments and the first and second child data segments.

7. The computer-readable storage medium of claim 6 wherein the criterion comprises a uniform resource identifier (URI) syntax.

8. The computer-readable storage medium of claim 6 wherein each data tag comprises a data tag label, and where identifying the set of digital objects further comprises identifying each data tag label consistent with the criterion.

9. The computer-readable storage medium of claim 6 wherein identifying the set of digital objects comprises identifying a set of digital images.

10. The computer-readable storage medium of claim 6 wherein each data tag comprises a text string annotation of the digital object.

11. A computer-implemented method of deriving a hierarchical structure of a set of multimedia files, the method comprising:
   receiving a query comprising a uniform resource identifier (URI) criterion;
   identifying, by the computer, the set of multimedia files, the identified set of the multimedia files having data tag values consistent with the criterion and the data tag values comprising descriptive information representing non-hierarchical information;
   grouping, by the computer, the multimedia files in the set by comparing descriptive information of the data tag associated with each multimedia file with descriptive information of the data tags associated with the other multimedia files in the set, wherein the multimedia files belonging to the set and associated with data tags having related descriptive information are grouped together into at least a superset group and a subset group and the superset group comprises each digital object in the subset group;

creating first and second parent data segments and first and second child data segments, wherein the first child data segment is also the second parent data segment;

labeling the first parent data segments consistent with the descriptive information of the data tag labels associated with the multimedia files in the superset and the first child data segment consistent with the descriptive information of the data tag labels associated with the multimedia files in the subset;

populating, by the computer, the first parent data segment with multimedia files having data tag labels with descriptive information related to those of the multimedia files in the superset and the first child data segment with multimedia files having data tag labels with descriptive information related to those of the multimedia files in the subset; and displaying the hierarchical structure of the set of multimedia files, wherein the first and second parent data segments and the first and second child data segments are represented by at least one of a tree and nested folders.

12. The method of claim 11, wherein the set of multimedia files comprises at least one of digital image files, digital audio files, and digital video files.

* * * * *